United States Patent [19]
Lee et al.

[11] Patent Number: 6,043,319
[45] Date of Patent: Mar. 28, 2000

[54] METHOD OF PREPARING VOID TYPE PLASTIC PIGMENT

[75] Inventors: HoSull Lee, Taejeon; Kyo-Dong Jo, Woolsan; Kill-Soo Jang, Woolsan; Min-Seok Cho, Woolsan, all of Rep. of Korea

[73] Assignee: Korea Kumho Petrochemical Co., Ltd., Rep. of Korea

[21] Appl. No.: 09/093,645

[22] Filed: Jun. 9, 1998

[30] Foreign Application Priority Data

Dec. 30, 1997 [KR] Rep. of Korea ................ 97-78205

[51] Int. Cl.[7] ................................................. C08F 265/02
[52] U.S. Cl. .............................. 525/301; 521/56; 521/57; 521/59; 521/76; 523/201
[58] Field of Search ..................................... 525/301, 902; 523/201; 521/56, 59, 57, 76

[56] References Cited

U.S. PATENT DOCUMENTS

| | | | |
|---|---|---|---|
| 4,427,836 | 1/1984 | Kowalski et al. | 525/301 |
| 4,594,363 | 6/1986 | Blankenship et al. | 525/201 |
| 5,527,613 | 6/1996 | Blankenship et al. | 525/301 |

*Primary Examiner*—Morton Foelak
*Attorney, Agent, or Firm*—Davidson, Davidson & Kappel, LLC

[57] ABSTRACT

Provided is a method of preparing a light-weight and inexpensive void type plastic pigment having enhanced hiding power and whiteness relative to inorganic pigments such as titanium oxide or organic pigments such as conventional styrene polymeric plastic pigments by regulating the content of each monomer in the sheath polymerization after core polymerization and controlling the glass transition temperature of the first sheath which is the shell obtained by initial polymerization less than that of the core by 70 to 120° C., thus increasing the difference of refractive index between the polymeric matrices.

2 Claims, No Drawings

METHOD OF PREPARING VOID TYPE PLASTIC PIGMENT

BACKGROUND OF THE INVENTION

1. Field of the Invention

The present invention relates to a method of preparing a void type plastic pigment and, more particularly, to a method of preparing a plastic pigment usable in place of inorganic pigments, e.g., titanium oxide ($TiO_2$) or organic pigments, e.g., a styrene plastic pigment in paints or paper coatings.

2. Discussion of Related Art

There has been widely used titanium oxide ($TiO_2$) as a material for rendering the hiding power to paints or paper coatings.

Titanium oxide has the refractive index of 2.3, which is high relative to most other polymers whose refractive indexes are around 1.5, so that it induces a scattering of light on the paints or paper coatings, thereby providing an opacity that increases the hiding power.

Titanium oxide is generally prepared by sulfate process or chloride process, both of which are detrimental as they involve production of contaminant materials that cause environmental problems.

Titanium oxide is such an inorganic material that adds the weight of a coated product and also very expensive. As a white pigment, it is thus now increasingly replaced with organic polymer.

There are two types of synthetic pigments as organic plastic pigments which can be substituted for titanium oxide; one of them consists of particles having multi-cellular structure including titanium oxide and air encapsulated with polymeric matrices, and the other type has an enclosed void structure using a solvent of no compatibility.

However, these pigments hardly contain uniform voids, requiring extremely complex processes for their preparation and high production costs, and they are ineffective in enhancing the hiding power of a coating.

With the view to solving the problem with such pigments, there has been suggested a void type plastic pigment. This type of plastic pigment that has internal voids is provided with hard shells and thus, when it is blended into paper coating color or water paint to form a coating lamination or coating, the internal voids can be maintained without formation of films.

Water is contained in such a void type plastic pigment in liquid state and vaporized while the coating lamination or coating is dried, with consequence of internal pore formation.

Hence, the incident light can be effectively scattered by the difference of refractive index between the internal pores and their encapsulated polymeric shells to increase the hiding power and whiteness.

Compared with plastic pigments having no pores, the void-containing plastic pigments can provide a scattering of light more effectively, thus leading to a great increase in hiding power and whiteness per unit weight.

A method of preparing a latex type plastic pigment with a void structure is disclosed in U.S. Pat. No. 4,427,836 and No. 4,594,363, and Korean Patent No. 80,123.

In the U.S. Pat. No. 4,427,836, a preparation involves in the use of tertiary amines in neutralizing polymeric acid contained in the core in order to form a void structure. However, tertiary amines are offensive-smelling and detrimental to human bodies.

To overcome the problem, the U.S. Pat. No. 4,594,363 discloses another method in which amines are substituted by inorganic bases such as potassium hydroxide. This method may decrease the toxicity and environmental problem caused by using amines but involve a gelation to produce fine coagulum in the process of polymerization.

A multi-step polymerization is disclosed in the Korean Patent No. 80,123. This is a multi-step emulsion polymerization that the formation of fine coagulum or secondary cores in the course of polymerization can be inhibited in the respective steps.

To describe such a method in more detail, the multi-step emulsion polymerization involves sequential seed-polymerizing, core-polymerizing, sheath-polymerizing, and shell polymerizing after swelling of the sheath polymer. This emulsion polymerization includes the steps of: seed-polymerizing an emulsion of acryl-based monomer mixture containing monomers with acid groups of about 16% to obtain a seed latex; adding an emulsion of acryl-based monomer mixture containing monomers with acid groups of about 35% to the seed latex for 3 hours and core-polymerizing the resulting mixture to obtain a core latex; adding an emulsion of acryl-based monomer mixture containing monomers with acid groups of about 5% to the core latex for 2 hours and sheath polymerization the resulting mixture to obtain a sheath latex; swelling the latex particles by addition of an aqueous potassium hydroxide solution up to pH 7; and adding a styrene monomer emulsion to the swollen latex and shell-polymerizing the resulting mixture.

However, the void type plastic pigment prepared by this multi-step emulsion polymerization hardly has an improvement in hiding power and whiteness to a large degree.

SUMMARY OF THE INVENTION

Accordingly, the present invention is directed to a method of preparing a void type plastic pigment that substantially obviates one or more of the problems due to limitations and disadvantages of the related art.

An object of the present invention is to provide a method of preparing a void type plastic pigment having enhanced hiding power and whiteness relative to other pigments by using a multi-step emulsion polymerization and regulating the content of each monomer in the step of sheath (or first shell in the two step reaction) polymerization which is the initial polymerization of the shell in the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof.

To achieve these and other advantages and in accordance with the purpose of the present invention, as embodied and broadly described, a method of preparing a void type plastic pigment includes the steps of: mixing a quarter of a first monomer emulsion consisting of butyl methacrylate, methyl methacrylate or butyl acrylate, and methacrylic acid containing a monomer having acid groups of 0.1 to 0.2 wt. % with an excess of water in the presence of an initiator with stirring for 1 hour, subsequently adding the rest of the first monomer emulsion and adding an initiator followed by mixing the resulting material with a second monomer emulsion consisting of butyl methacrylate, methyl methacrylate or butyl acrylate, and methacrylic acid containing a monomer having acid groups of 30 to 35 wt. % to obtain a core latex; and adding a third monomer emulsion consisting of butyl methacrylate of 20 to 90 wt. %, methyl methacrylate or butyl acrylate of 5 to 75 wt. % and methacrylic acid of 1 to 5 wt. % to the core latex for 2 hours to polymerize a sheath, swelling the sheath by adding an aqueous potassium hydroxide solution and adjusting pH 9 to 10, and adding a styrene monomer emulsion to the swelled sheath to perform a second polymerization.

It is to be understood that both the foregoing general description and the following detailed description are exemplary and explanatory and are intended to provide further explanation of the invention as claimed.

DETAILED DESCRIPTION OF THE INVENTION

The present invention involves a method of preparing a void type plastic pigment having enhanced hiding power and whiteness by increasing the reaction stability of core polymerization to inhibit the formation of fine coagulum, regulating the content of each monomer in the step of the sheath polymerization to obtain a layer having the glass transition temperature (Tg) lower than that of the core by 70 to 110° C., thereby increasing the difference of refractive index between the polymeric matrices.

The polymerization in each step of the present invention is an emulsion polymerization and includes polymerization for core and shell.

In the present invention, the step of core polymerization is an integrated seed and core polymerization. There is first prepared a monomer emulsion consisting of butyl methacrylate, methyl methacrylate or butyl acrylate, and methacrylic acid containing monomers with acid groups in the range of 0.1 to 0.2 wt. %. A quarter of the total emulsion is added to an excess of water and the polymerization starts with the addition of an initiator. After 30 minutes of reaction, the rest of the emulsion is added into the mixture for one hour and subjected by stirring for 1 hour to stabilize the reaction. The latex obtained in the middle of the reaction has mono-dispersed particles with an average particle size of about 1800 Å.

Upon adding an emulsion of consisting of butyl methacrylate, methyl methacrylate or butyl acrylate, and methacrylic acid containing monomers with acid groups of about 30 to 35 wt. % for 2 hours, the mixture is subjected to stirring for 1 hour to obtain a core latex.

This core latex produced with high yields is stable and contains no fine coagulum that are typically found in the core latex prepared by conventional methods.

Following the preparation of core latex, there is conducted a shell polymerization that's different from the conventional method where the individual polymerization are conducted in the stepwise way.

First, emulsion consisting of butyl methacrylate 20 to 90 wt. %, methyl methacrylate or butyl acrylate 5 to 75 wt. %, and methacrylic acid 1 to 5 wt. % is added to a part of the core latex for 2 hours in the presence of an initiator. This mixture is placed for 1 hour reaction (sheath polymerization or initial polymerization of shell).

The content of each monomer must be regulated in the specified range as above so that the Tg of the shell obtained by the initial polymerization is preferably lower than that of the core by about 70 to 120° C., more preferably, about 70 to 110° C.

Where the Tg of the sheath is lower than that of its adjacent core by less than 70° C., the difference of refractive index between the polymeric matrices is too small with the consequence of poor application properties. If the difference of Tg is above 120° C., the Tg of the sheath is also too low to provide the refractive index difference from the core. This fact is demonstrated by the result of TEM (Transmission Electron Microscope), where there is no phase separation between the core and the sheath. It is thus concluded that an extremely large difference of Tg between the core and the sheath results in a phase fusion of the core and the first sheath.

After the initial polymerization, pH is adjusted 9 to 10, by the addition of an aqueous potassium hydroxide solution to swell the latex.

This swelling procedure is to increase the average particle size of the latex from about 6,000 Å to about 8,000 Å.

After adding another portion of an initiator to the swelled sheath, a styrene monomeric emulsion is then added for the purpose of inducing a shell polymerization to produce a hard shell (increment polymerization of shell).

The resulting latex preferably has the particle size of between 9,000 and 11,000 Å.

The present invention can produce a void type plastic pigment having enhanced hiding power and whiteness by maintaining a defined difference of glass transition temperature between the core and the sheath to increase a large difference of refractive index between the polymeric matrices.

Following examples are exemplary only and are not to be considered as limiting the scope of the invention.

EXAMPLE 1

(1) Core Polymerization

A monomer emulsion was prepared by adding an aqueous DBSNa solution 120 g to a monomer mixture consisting of butyl methacrylate, methyl methacrylate and methacrylic acid in the weight ratio of 5.00:4.28:0.14.

After mixing a quarter of the total monomeric emulsion with water of 85.070 g, the mixture was heated to 85° C., followed by an addition of an aqueous potassium persulfate solution 843 g as an initiator, and stirring for 30 minutes. The rest of the monomer emulsion was then added for 1 hour and the mixture was stirred for 1 additional hour.

In the meantime, a monomer emulsion to be used in an increment polymerization was prepared in the amount of 62,480 g. The content of the monomer with acid group was 33.9 wt. % with respect to the total monomer.

Immediately after adding an aqueous potassium persulfate solution of 6,286 g to the reactant, the previously-prepared monomer emulsion for use in the increment polymerization was added for 2 hours and the mixture was stirred for 1 additional hour.

Thus obtained core latex had the average particle size of 4,000 Å and was found out to contain no fine coagulum.

(2) Shell Polymerization

The core latex 10,390 g and water 52,910 g were mixed and heated to 85° C. with stirring. Upon adding an aqueous potassium persulfate solution 7,430 g to initiate the reaction, there was further added for 2 hours a monomer emulsion prepared by mixing a mixture 20,000 g consisting of butyl methacrylate 60 wt. %, methyl methacrylate 35 wt. % and methacrylic acid 5 wt. % with water 14,000 g and aqueous DBSNa solution 1,000 g as an anionic emulsifier. The resulting mixture was stirred for 1 hour to produce a latex having the average particle size of 6,000 Å (initial polymerization).

At this stage, the glass transition temperature of a sheath was lower than that of the core by 78° C.

An aqueous KOH solution 14,000 g was added to the reactant at 85° C., and the mixture was stirred for 2 hours to swell the obtained polymeric material. The average particle size was 8,000 Å.

After an addition of aqueous potassium persulfate solution 6,860 g, a styrene monomeric emulsion 46,000 g was introduced for 2 hours (increment polymerization).

Thus produced void plastic pigment had the average particle size of 10,000 Å.

EXAMPLES 2 AND 3, AND COMPARATIVE EXAMPLES 1 TO 3

Void type plastic pigments were prepared analogously to Example 1 with the exception that the content and composition of the monomer used for the initial polymerization in the step of (2) Shell Polymerization were varied as given in Table 1.

The glass transition temperature of a sheath and the difference of glass transition temperature between the core and the sheath with respect to the varied content of the monomer were calculated theoretically according to the compositions of the monomer and listed in Table 1.

TABLE 1

| | | EXAMPLE | | | COMPARATIVE EXAMPLE | | |
|---|---|---|---|---|---|---|---|
| | | 1 | 2 | 3 | 1 | 2 | 3 |
| CONTENT OF | A) | 60.0 | 85.0 | 90.0 | 20.0 | — | — |
| MONOMER IN THE | B) | 35.0 | 10.0 | — | 75.0 | 50.0 | 46.7 |
| STEP OF THE SHEATH | C) | — | — | 5.0 | — | 45.0 | 52.0 |
| (wt. %) | D) | 5.0 | 5.0 | 5.0 | 5.0 | 5.0 | 1.3 |
| E) | | 52 | 33 | 20 | 88 | 15 | 2 |
| F) | | 78 | 97 | 110 | 42 | 115 | 128 |

A) BUTYL METHACRYLATE
B) METHYL METHACRYLATE
C) BUTYL ACRYLATE
D) METHACRYLIC ACID
E) Tg OF SHEATH (° C.)
F) Tg OF CORE SHELL-Tg SHEATH (° C.)

COMPARATIVE EXAMPLE 4

(1) Seed Polymerization

Water 517.5 g and an aqueous 10% DBSNa solution as an anionic emulsifier 2.4 g were mixed in a reactor and heated to 85° C. with stirring.

Meanwhile, an acryl-based monomer emulsion was prepared by blending a mixture 152.5 g of butyl acrylate, methyl methacrylate and methacrylic acid (in the weight ratio of 52:46.7:1.3) into water 48.0 g and DBSNa 1.1 g.

Upon placing about 1/30 of the total acryl-based monomer emulsion in the reactor, aqueous 3.5% potassium persulfate solution 4.7 g as an initiator was added to initiate the reaction.

The rest of the acryl-based monomer emulsion was added to the reactor to complete the reaction in 30 minutes after the initiation. Thus obtained seed latex had the solid content of 20.7% and the average particle size of 2,000 Å.

(2) Core Polymerization

The seed latex 86.8 g in addition of water 217.5 g was heated to 85° C. with stirring, and an aqueous potassium persulfate solution 21.4 g as an initiator was added to initiate the reaction.

To the resulting mixture was then added for 2 hours a monomer emulsion prepared by blending a mixture 151.5 g of butyl acrylate, methyl methacrylate and methacrylic acid (in the weight ratio of 5:55:40) into water 52.5 g and DBSNa 7.5 g, and subjected by stirring to produce a core latex. The average particle size of the core latex was 3,730 Å.

(3) Sheath Polymerization

The core latex 277.2 g in addition of water 1,590 g was heated to 85° C. with stirring.

Upon adding an aqueous potassium persulfate solution 196.9 g as an initiator, a monomer emulsion prepared by blending a mixture 544.5 g of butyl methacrylate, methyl methacrylate and methacrylic acid (in the weight ratio of 20:75:5) into water 371.0 g and DBSNa 53.0 g was added to the resulting mixture for 2 hours and stirred for 1 additional hour to complete the reaction.

The reaction was designed to allow a sheath to have the Tg of 88° C.

(4) Shell Polymerization

The sheath polymer 3,034 g was introduced into the reactor and heated to 85° C. After the dropwise addition of an aqueous KOH solution of 450.0 g, the mixture was subjected by stirring at 85° C. for 2 hours.

Thus swelled latex had the average particle size of 8,000 Å with pH 10.

An aqueous potassium persulfate solution of 205.7 g was then added to the swelled latex and the styrene monomeric emulsion was introduced into the mixture for 2 hours.

The void type plastic pigment produced was 10,000 Å in the average particle size.

EXPERIMENTAL EXAMPLE

The plastic pigments prepared by the procedures according to Examples 1 to 3 and Comparative Examples 1 to 4 were measured for hiding power and whiteness. Results are shown in Table 2.

Measurements were performed with an automatic reflectometer (from Kumagai Riki Kogyo Co. model name: KR-III) after mixing the respective plastic pigments with a coating adhesive in a defined ratio, having the same amount of each mixture coated on a poly-carbonate film into a designated size, and drying the coating at room temperature.

TABLE 2

| | EXAMPLE | | | COMPARATIVE EXAMPLE | | | |
|---|---|---|---|---|---|---|---|
| | 1 | 2 | 3 | 1 | 2 | 3 | 4 |
| HIDING POWER | 34.4 | 72.0 | 75.2 | 15.1 | 30.4 | 17.3 | 15.2 |
| WHITENESS | 38.5 | 74.8 | 77.3 | 18.1 | 34.7 | 32.6 | 18.3 |

As understood from Table 2, where the sheath has such a low transition temperature to give the difference of Tg between the core and the sheath is about 70 to 110° C., hiding power and whiteness were increased as the temperature difference increased. If the difference of Tg is less than 70° C. or above 110° C., both properties were deteriorated.

It is thus considered that where the difference of glass transition temperature between the core and the sheath is small, the application property was hard to increase due to insignificant difference of refractive index between polymeric matrixes. Too large difference of Tg caused a phase fusion of the sheath and the core and also resulted in no difference of refractive index.

If the difference of Tg is 115° C. as in Comparative Example 2, hiding power and whiteness were very low relative to that in Example 3 but higher than that in Comparative Example 1. This is due to content of butyl methacrylate. Consequently, the difference of Tg between the core and the sheath can be appropriate even at 120° C.

Plastic pigments prepared by the above Examples 1 to 3 and Comparative Examples 1 to 3 consisting the steps of core and shell polymerization have good hiding power and whiteness comparing Comparative Example 4 consisting the four steps polymerization.

As described above, the present invention provides a method of preparing a plastic pigment having hiding power and whiteness, more enhanced with the increasing difference of Tg between core and sheath insofar as no phase fusion occurs, by regulating the content of monomer used in the sheath polymerization. The plastic pigment prepared by the present invention is therefore useful as an inorganic pigment that can substitute organic pigments, e.g., titanium oxide, or organic pigments, e.g., styrene polymeric plastic pigments.

It will be apparent to those skilled in the art that various modifications and variations can be made in the method of preparing a void type plastic pigment of the present invention without departing from the spirit or scope of the invention. Thus, it is intended that the present invention cover the modifications and variations of this invention provided they come within the scope of the appended claims and their equivalents.

What is claimed is:

1. A method of preparing a void type plastic pigment, comprising the steps of:

emulsion polymerization of a core by adding an initiator to a quarter of a first monomer emulsion containing one or more acrylate esters having an alkyl group of from 1 to 4 carbon atoms and monoethylenically unsaturated carboxylic acid containing acid functional groups of 0.1 to 0.2 wt. %, subsequently adding the rest of the first monomer emulsion to the mixture, followed by adding a second monomer emulsion containing one or more acrylate esters selected from the group consisting of butyl methacrylate, methyl methacrylate and butyl acrylate, and methacrylic acid having acid groups of 35 to 45 wt. % to the resulting material in the presence of an initiator; and encapsulating said core with a sheath by emulsion polymerization to result in a sheath polymer latex having a Tg less than that of the core by 70 to 110° C. by adding a monomer emulsion consisting of butyl methacrylate of 20 to 90 wt. %, methyl methacrylate or butyl acrylate of 10 to 75 wt. % and methacrylic acid of 1 to 5 wt. % in the presence of said core and an initiator for about 2 hours subsequently swelling the sheath in the presence of an aqueous potassium hydroxide solution and adjusting pH at about 9, and polymerizing a shell by adding a styrene monomer emulsion to the swelled sheath.

2. A method of preparing a void type plastic pigment, comprising the steps of:

emulsion polymerization of a core by adding an initiator to a quarter of a first monomer emulsion containing one or more acrylate esters selected from the group consisting of butyl methacrylate, methyl methacrylate and butyl acrylate, and methacrylic acid having acid groups of 0.1 to 0.2 wt. %, subsequently adding the rest of the first monomer emulsion to the mixture, followed by adding a second monomer emulsion containing one or more acrylate esters selected from the group consisting of butyl methacrylate, methyl methacrylate and butyl acrylate, and methacrylic acid having acid groups of 35 to 45 wt. % to the resulting material in the presence of an initiator; and encapsulating said core with a sheath by emulsion polymerization to result in a sheath having a Tg less than that of the core by 70 to 110° C. by adding a monomer emulsion consisting of butyl methacrylate of 20 to 90 wt. %, methyl methacrylate or butyl acrylate of 10 to 75 wt. % and methacrylic acid of 1 to 5 wt. % in the presence of said core and an initiator for about 2 hours subsequently swelling the sheath in the presence of an aqueous potassium hydroxide solution and adjusting pH at about 9, and polymerizing a shell by adding a styrene monomer emulsion to the swelled sheath.

* * * * *